Nov. 8, 1949    P. W. NIPPERT    2,487,667
APPARATUS FOR MEASURING BODIES POSSESSING A UNIFORM
WEDGE-SHAPED CROSS-SECTIONAL CONFIGURATION
Filed July 17, 1947

Inventor
Paul W. Nippert

By W. S. McDowell
Attorney

Patented Nov. 8, 1949

2,487,667

UNITED STATES PATENT OFFICE 2,487,667

APPARATUS FOR MEASURING BODIES POSSESSING A UNIFORM WEDGE-SHAPED CROSS-SECTIONAL CONFIGURATION

Paul W. Nippert, Columbus, Ohio

Application July 17, 1947, Serial No. 761,452

5 Claims. (Cl. 33—168)

The present invention relates to mensuration apparatus, and has particular reference to an improved gage block which, specifically considered, may be utilized in determining or checking the dimensional accuracy of commutator segment-forming bars of the type possessing a generally uniform wedge-shape cross-sectional configuration.

In the formation of commutators for electric motors and similar dynamo-electric apparatus, a plurality of wedge-shaped copper or other metal segments are utilized to form the circular commutator annulus. Each of the metallic segments of the commutator are disposed in radially extending order, and are spaced apart from one another by means of strips of insulating material possessing a generally rectangular configuration. It will be understood, that the general overall configuration of the commutator annulus must be in exact circular form, with each copper segment being formed with equal segmental angles, in order that a uniform and compact circular structure may be obtained. Various numbers of segments may be used in accordance with the requirements and dimensions of individual commutators, but in all cases it is necessary that the individual segments possess the same segmental angularity, and the same thicknesses at their respective outer edges, in order that a uniform and true circular body may be obtained upon assembly of the individual segments.

The segments of a commutator are usually formed from metallic strips or bars which are drawn or extruded through a die possessing the desired cross-sectional configuration of the finished segment, and should discrepancies occur during the formation of such bars, the assembly of the individual commutator segments will result in an uneven and untrue circular annulus.

Heretofore, the dimensional accuracy of such bars has been checked or determined through the use of an instrument known as a sine bar, or through the use of a mechanical protractor provided with a pair of adjustable arms between which a segment-forming bar was positioned to determine the segmental angle thereof by visual reference to the spacing, if any, occurring between the arms of the protractor and the outer surfaces of the segment-forming bar. In the latter case, the measurement of the segment-forming bars was extremely inaccurate due to the discrepancies encountered by the nature of the visual check associated with such mechanical protractors. The primary objection to the use of a sine bar in checking or determining the accuracy of formation of the individual segment-forming bars, was due to the time required in accurately adjusting the sine bar to its desired angle, through the use of Johansson blocks, and in consequently determining through relatively complicated mathematical formula the proper segmental angle of the associated bar.

Accordingly, it is the primary object of this invention to provide an improved and simplified gage block, utilized in conjunction with a micrometer, for determining the segmental angle and the outer edge thickness of a given commutator segment-forming bar.

It is another object of this invention to provide a gage block of the character described, wherein the upper surface of the block is formed with a substantially wedge-shape cavity adapted for the flat reception of a segment-forming bar which, if properly formed will provide an upper surface exactly parallel to the base surface of the block, whereby a micrometer measurement may be made between the flat base surface of the block and the upper surface of the commutator segment-forming bar. In the event such measurement is of uniform character, it will be understood that the associated bar possesses the proper segmental angle. Also, the depth of the recess formed in the upper surface of the block is such that the thickness of the outer or thicker edge of the individual segment-forming bar may be determined by micrometer measurement between the base surface of the block and the upper surface of the bar. It follows therefore, that if a given bar possesses the proper segmental angle and the proper outer edge thickness, the inner edge of the bar must necessarily be of the proper thickness.

For a further and more complete understanding of the present invention and additional objects and advantages embodied therein, reference is made to the following description and the accompanying drawings wherein.

Figure 1:
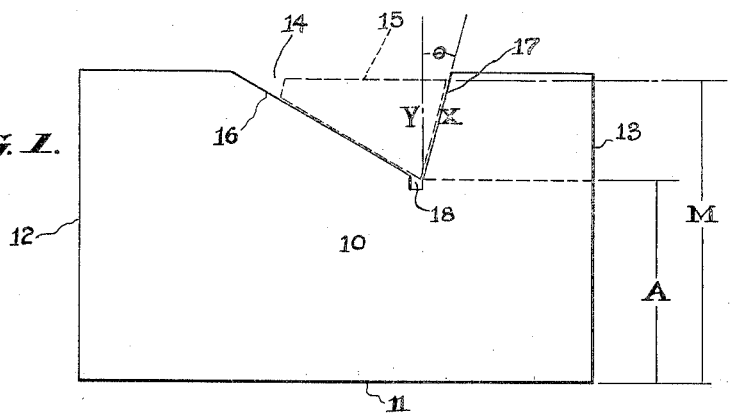
Fig. 1 is a side elevational view of a gage block formed in accordance with the present invention.
Figure 2:
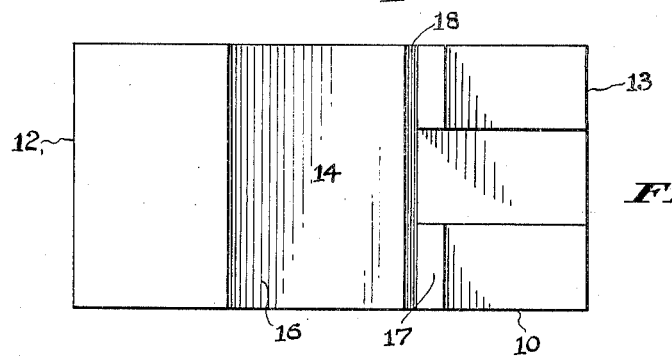
Fig. 2 is a top plan view thereof.
Figure 3:
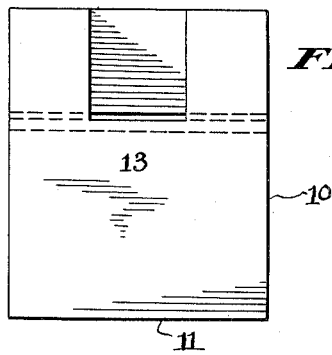
Fig. 3 is an end elevational view of the block.
Figure 4:
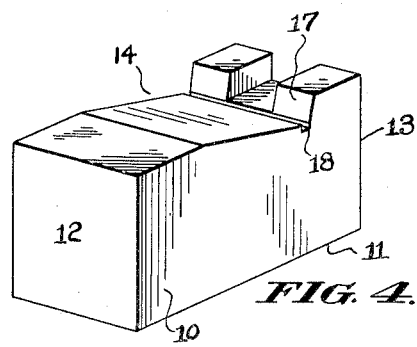
Fig. 4 is a perspective view thereof.
Figure 5:
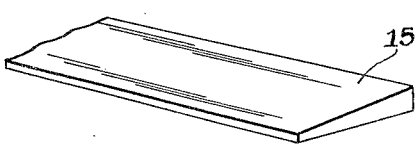
Fig. 5 is a fragmentary perspective view of a commutator segment-forming bar of the type measured within the associated gage block.

Referring now to the drawings, it will be seen that the present improved segment gage utilizes a substantially cubical block 10, preferably formed from a tungsten steel alloy, or other suitable non-oxidizing and relatively hard metal or alloy of the type normally used in forming precision instruments. The block is formed with an accurately ground or planed flat base surface 11, and a pair of exactly perpendicular end walls, 12 and 13 respectively. The upper surface of the block is provided with a substantially V-shaped open cavity or recess 14 in which may be positioned, in crosswise and transverse manner, a portion of a relatively elongated commutator segment-forming bar 15 for transverse micrometer measurement with respect to the planar base surface 11 of the block.

As before stated, the primary functions of the present gage block are the facile and accurate determination or checking of the dimensional accuracy of preformed segment-forming bars, particularly as to the proper segmental angle and the outer end thickness thereof. In the formation of the segment bars 15, substantially rectangular strips of copper are passed or drawn longitudinally through a wedge-shaped die or cutting form of predetermined dimensions, or are coined or rolled, in order that a uniform wedge-shaped cross-sectional configuration is given to the strip of copper. It is of extreme importance that each of the bars, which ultimately form the individual segments of a given size commutator annulus, possess the proper segmental angle, in order that upon assembly of the segments a uniform and truly circular body may be obtained. Likewise, the thicknesses at the inner and outer edge of the bar is critical in determining the desired circumference of the finished commutator. The segmental angle of the bars, commonly referred to as the "Copper angle," is defined as the included angle between the sides of each of the bars, or the angle of arc which each segment of a circular commutator occupies with respect to the complete circle. For instance, if a given commutator annulus is made up of 18 segments, the proper segmental angle of each of the segments would be 360° divided by 18, or the number of segments, which would give an angle of 20° to each segment. It is well known that between each segment of a commutator a thin strip of insulating material is positioned to electrically insulate one segment from another, but due to the fact that the strips of insulation are of rectangular cross-sectional configuration, the segmental angle of the individual strips will remain the same and will form, upon assembly, a truly circular annulus.

Accordingly, to determine whether or not a given segment-forming bar possesses the proper segmental angle, the V-shaped cavity 14, formed in the upper surface of the block 10 is defined by a pair of relatively intersecting inwardly inclined planar surfaces or walls, 16 and 17 respectively; wherein the wall 16 possesses an angle of inclination, with respect to a plane parallel to the base surface 11, of 360° divided by the number of segments of a given commutator, or in other words the correct segmental angle of a properly formed bar. The adjoining and relatively intersecting wall 17 of the cavity is also angularly inclined, with respect to a plane perpendicular to the plane of the base surface, at an angle of inclination equal to one-half the angle of inclination of the wall 16. In this manner, the angle formed by the intersection of the two walls is equal to the angle formed by side and the outer edge of a properly formed and dimensionally accurate commutator bar, and when a preformed bar is positioned, as indicated in Fig. 1 of the drawings, within the cavity, the upper exposed side surface of the bar should lie along a plane exactly parallel to the plane of the base surface 11 of the block if the bar is formed with the proper segmental angle. The determination of such parallelism may be easily accomplished by transverse micrometer measurement between the upper surface of the bar and the planar base surface of the block, and for practical purposes, the micrometer measurement should be the same from one edge to the other of the bar.

In the formation of the two inclined walls 16 and 17 of the cavity, a transverse trough or recess 18 occurs below the line of intersection of the walls, due to the inability or impracticability of planing the surfaces to meet at an exact and sharp angle. Nevertheless, the relative line of intersection of these two surfaces is determined before machining or planing operations, in order to accurately determine the perpendicular distance between the planar base surface of the block and the plane of such line. In knowing the distance between the base of the block and the line of intersection of the two walls 16 and 17, a determination of the thickness of the outer or thicker edge of a bar positioned in the cavity may be easily had by subtracting such distance from a micrometer reading between the base surface of the block and the upper surface of a bar positioned in the cavity, and it follows, that if a bar possesses the proper segmental angle and the proper outer edge thickness, the inner or thin edge of the bar must necessarily be of proper thickness. It will be seen, that this measurement does not represent the thickness at the exact outer edge of the bar, due to the angular disposition of the bar within the cavity, but in the case of bars having a relatively small segmental angle, the difference between this latter measurement and the actual thickness of the outer edge of the bar is negligible to the extent that it may be disregarded. However, in the formation of commutators comprising a relatively small number of segments, wherein the segmental angle of the individual bars is relatively large, it is necessary to determine accurately the thickness at the outer edge of the bar, in order to accurately check the circumferential measurement of the subsequently completed and assembled commutator annulus. In such a case, the actual thickness of the exact outer edge of the bar may be determined mathematically by the formula $$X = \frac{Y}{\cos \theta}$$

where X represents the true thickness of the outer edge of the bar, Y represents the perpendicular distance from the upper surface of the bar to the relative line of intersection of the walls 16 and 17 and is obtained by subtracting the known perpendicular distance A between the base surface of the block and the intersection line of the two walls from the micrometer measurement M between the base 11 and the upper surface of the bar, and $\theta$ represents the angle of inclination of the wall 17 with respect to a plane perpendicular to the base surface 11.

For example, if the known distance A is 1.000 inch, and the micrometer measurement M is 1.500, then the perpendicular thickness Y of the bar is equal to 0.500 inch. Further, if the desired commutator contains 12 segments, the proper segmental angle of each bar will be 360° divided by 12, or 30°, therefore the angle $\theta$, or the angle of inclination of the wall 17 with respect to the perpendicular, will equal one-half of 30°, or 15°; hence X, the actual thickness of the bar at its outer edge, will be found to be:

$$X = \frac{Y}{\cos \theta}$$

$$X = \frac{0.500 \text{ inch}}{\cos 15}$$

$$X = \frac{0.500 \text{ inch}}{.966}$$

$$X = .518 \text{ inch}$$

In addition to the accurate check afforded by micrometer measurement across the upper surface of the bar to determine parallelism with respect to the base surface of the block, a visual check may be easily made with respect to the surfaces of the bar which abut the two inclined walls 16 and 17 of the cavity to determine the snugness of fit between these surfaces. Also, the block may be used in conjunction with other suitable measuring instruments, such as, a dial indicator, height gage, or shadow gage.

In some instances, where relatively few segments are employed in the formation of a commutator annulus, and wherein the segmental angle of the individual segments is relatively large, it has been found desirable to provide segment-forming bars with a crowned or arcuately formed thicker and outer edge. In such instances, the present gage functions with equal facility in the measurement of such crowned bars, but in determining the thickness of the outer edge of the bar it is necessary to apply a mathematical correction to the usual micrometer measurement M, due to the arcuate abutting edge of the bar, and the fact that the lowermost point of the bar will be positioned slightly above the intersection of the two walls 16 and 17 of the block. Such correction may be easily determined by mathematical formula corresponding to the angle of arc of the outer or thicker edge of the bar.

To facilitate micrometer measurement, a slot 19 is provided in the wall 17 of the cavity, in order that ample clearance may be had between the upper stylus of a micrometer and the wall 17 when a reading is being taken at the extreme thick edge of a bar positioned in the cavity.

In view of the foregoing, it will be seen that the present invention provides a highly useful and accurate instrument for checking the dimensional accuracy of preformed commutator segment forming bars, the same being characterized by its ease of operation and its structural simplicity. Further, gages formed in accordance with the present invention provide an efficient and accurate means of quickly determining both the segmental angle and outer edge thickness of the segment-forming bars utilized to form a given commutator. The use of the present gage block, in conjunction with a micrometer, eliminates the heretofore relatively complicated and haphazard methods incident to the use of sine bars, protractors, and other relatively complicated and expensive measuring apparatus, and results in the formation or ready determination of dimensionally accurate and truly circular commutators of a superior nature.

While a present preferred form of this invention has been disclosed in detail, it will be manifest that various modifications as to design and details of construction may be employed without departing from the scope of the following claim.

I claim:

1. A gage block for determining the dimensional accuracy of preformed commutator segment-forming bars of wedge-shaped cross-sectional configuration, comprising a body formed with a flat planar base surface and an upper surface having an open inwardly inclined recess in which a commutator bar may be positioned for transverse micrometer measurement, said recess being defined by a pair of inwardly inclined planar surfaces intersecting along a line disposed at a predetermined distance from the base surface of the body, one of the planar surfaces of said recess being inclined with respect to a plane parallel to the plane of said base surface at an angle of 360° divided by the number of segments comprising a given commutator annulus, the other of the planar surfaces of said recess being inclined with respect to a plane perpendicular to the plane of said base surface at an angle equal to one-half the angle of inclination of said first-named planar surface, whereby the upper surface of a segment-forming bar positioned within said recess will lie along a plane parallel to the plane of the base surface of said body.

2. A gage block for determining the dimensional accuracy of a preformed commutator segment-forming bar of wedge-shaped cross-sectional configuration, wherein the dimensions of a correctly formed bar are of a known and predetermined value, said block comprising a body formed with a flat planar base surface and an upper surface having an open wedge-shaped cavity for the flat crosswise reception of a segment forming bar, said cavity being defined by a pair of relatively intersecting and angularly inclined planar surfaces, one of the surfaces of said cavity having an angle of inclination with respect to a plane parallel to the plane of said base surface equal to the segmental angle of a dimensionally correct segment-forming bar, the other of the planar surfaces of the recess having an angle of inclination with respect to a plane perpendicular to the plane of said base surface equal to one-half the angle of inclination of the first named planar surface of the cavity, whereby the upper surface of a correctly formed segment-forming bar positioned in said recess will lie in a plane exactly parallel to the plane of the base surface of said body.

3. A gage block for checking the dimensional accuracy of a preformed commutator segment-forming bar of wedge-shaped cross-sectional configuration, wherein the dimensions of a correctly formed bar are of a known and calculated value, said block comprising a substantially cubical body formed with a flat planar base surface and an upper surface provided with an open wedge-shaped cavity for the flat crosswise reception of a segment-forming bar, said cavity being defined by a pair of relatively intersecting planar surfaces, the relative line of intersection of said surfaces being disposed at a predetermined perpendicular distance from the base surface of said body, one of the planar surfaces of said cavity being included with respect to a plane parallel to said base surface at an angle equal to the segmental angle of a dimensionally correct segment-forming bar, the other of the planar surfaces of the cavity being inclined with respect to a plane perpendicular to said base surface at an angle equal to one-half the segmental angle of a dimensionally correct segment-forming bar, whereby the upper surface of a correctly formed segment-forming bar positioned in said cavity will lie in a plane exactly parallel to the plane of the base surface of said body.

4. A gage block for checking the dimensional accuracy of a preformed commutator segment-forming bar of wedge-shaped cross-sectional configuration, comprising a cubical body formed with a planar base surface and an opposite surface having an open transversely extending inwardly directed wedge-shaped cavity in which a segment-forming bar may be positioned for transverse micrometer measurement, said cavity being defined by a pair of relatively intersecting planar surfaces, the line of intersection of said surfaces being disposed at a predetermined perpendicular distance from the base surface of said body, one of the planar surfaces of said cavity being inclined with repect to a plane parallel to said base surface at an angle of 360° divided by the number of segments of a given commutator, the other of the planar surfaces of said cavity being inclined with respect to a plane perpendicular to said base surface at an angle equal to one-half the angle of inclination of said first named surface, whereby the upper surface of a correctly formed segment-bar positioned in said cavity will lie in a plane exactly parallel to the plane of said base surface.

5. A gage block for determining the dimensional accuracy of preformed wedge-shaped bodies having a pair of angularly related opposite and equal planar sides, comprising a body formed with a planar reference surface and an oppositely disposed region for the reception of a body to be gaged, said region comprising a pair of angularly related planar surfaces intersecting along a line disposed at a predetermnied perpendicular distance from said reference surface, one of the planar surfaces of said region being inclined with respect to a plane parallel to said reference surface at an angle equal to the included angle between the equal planar sides of a dimensionally correct wedge-shaped body, the other of the planar surfaces of said region being inclined with respect to a plane perpendicular to the plane of said reference surface at an angle equal to one-half the included angle of a dimensionally correct body, whereby one side of a wedge-shaped body of undetermined dimensions when positioned on said region will lie along a plane parallel to the plane of said reference surface if possessed of the proper dimensional accuracy.

PAUL W. NIPPERT.

REFERENCES CITED

The following references are of record in the file of this patent:

UNITED STATES PATENTS

| Number | Name | Date |
|--------|------|------|
| 989,512 | Riehl et al. | Apr. 11, 1911 |

OTHER REFERENCES

Johansson Catalog No. 17, Aug. 9, 1945.